United States Patent [19]

Kraus et al.

[11] Patent Number: 4,583,634

[45] Date of Patent: Apr. 22, 1986

[54] STEP-TYPE PRODUCTION LINE AND METHOD OF OPERATING SAME

[75] Inventors: Josef Kraus, Neusäss; Franz Jaufmann, Wehringen, both of Fed. Rep. of Germany

[73] Assignees: Kuku Schweissanlagen; Roboter GmbH, both of Augsburg, Fed. Rep. of Germany

[21] Appl. No.: 517,827

[22] Filed: Jul. 27, 1983

[30] Foreign Application Priority Data

Jul. 29, 1982 [DE] Fed. Rep. of Germany ....... 3228378

[51] Int. Cl.$^4$ ............................................. B65G 43/08
[52] U.S. Cl. ................................... 198/341; 198/345; 228/47
[58] Field of Search ......... 198/339, 341, 345; 29/33 P, 563, 430; 228/7, 9, 10, 47; 219/79, 78.01

[56] References Cited

U.S. PATENT DOCUMENTS

| | | | |
|---|---|---|---|
| 3,342,125 | 9/1967 | Curran | 198/339 |
| 3,690,433 | 9/1972 | Buldini | 198/345 |
| 4,162,387 | 7/1979 | De Candia | 219/79 |
| 4,213,554 | 7/1980 | Sciaky | 228/47 |
| 4,306,646 | 12/1981 | Magni | 198/341 |
| 4,369,872 | 1/1983 | Sticht | 198/339 |
| 4,404,451 | 9/1983 | Niikawa et al. | 228/47 |
| 4,411,354 | 10/1983 | Thibault et al. | 29/430 |
| 4,438,839 | 3/1984 | Tomson | 198/345 |
| 4,441,645 | 4/1984 | Takagishi et al. | 228/47 |
| 4,448,341 | 5/1984 | Fujikawa et al. | 228/47 |
| 4,460,966 | 7/1984 | Chynoweth et al. | 198/341 |
| 4,503,596 | 3/1985 | Ida et al. | 198/341 |

FOREIGN PATENT DOCUMENTS

| | | | |
|---|---|---|---|
| 22095 | 1/1981 | European Pat. Off. | 198/345 |
| 1153322 | 8/1963 | Fed. Rep. of Germany | 198/341 |
| 2428841 | 1/1975 | Fed. Rep. of Germany | 228/47 |
| 1366019 | 6/1964 | France | 198/341 |
| 84275 | 5/1982 | Japan | 228/47 |

Primary Examiner—Joseph E. Valenza
Assistant Examiner—Daniel R. Alexander
Attorney, Agent, or Firm—Karl F. Ross; Herbert Dubno

[57] ABSTRACT

A production line for working on a succession of workpieces has a transporter or conveyor defining a longitudinal path for carrying and displacing the succession of workpieces in longitudinal stop-and-go steps through a succession of stations generally longitudinally equispaced along the path, respective machines at the stations for lifting the workpieces off the conveyor and working on the workpieces as same are stopped between transport steps, and a lifter at at least one of the stations for raising the workpieces thereof off the conveyor and holding them clear thereof between transport steps. Thus some of the stations are merely holding or nonworking stations where nothing is done to the workpieces. The machines at this or these stations can be adapted to work only on other types of workpieces mixed in with the production run, or only on certain of the workpieces for custom work.

9 Claims, 7 Drawing Figures

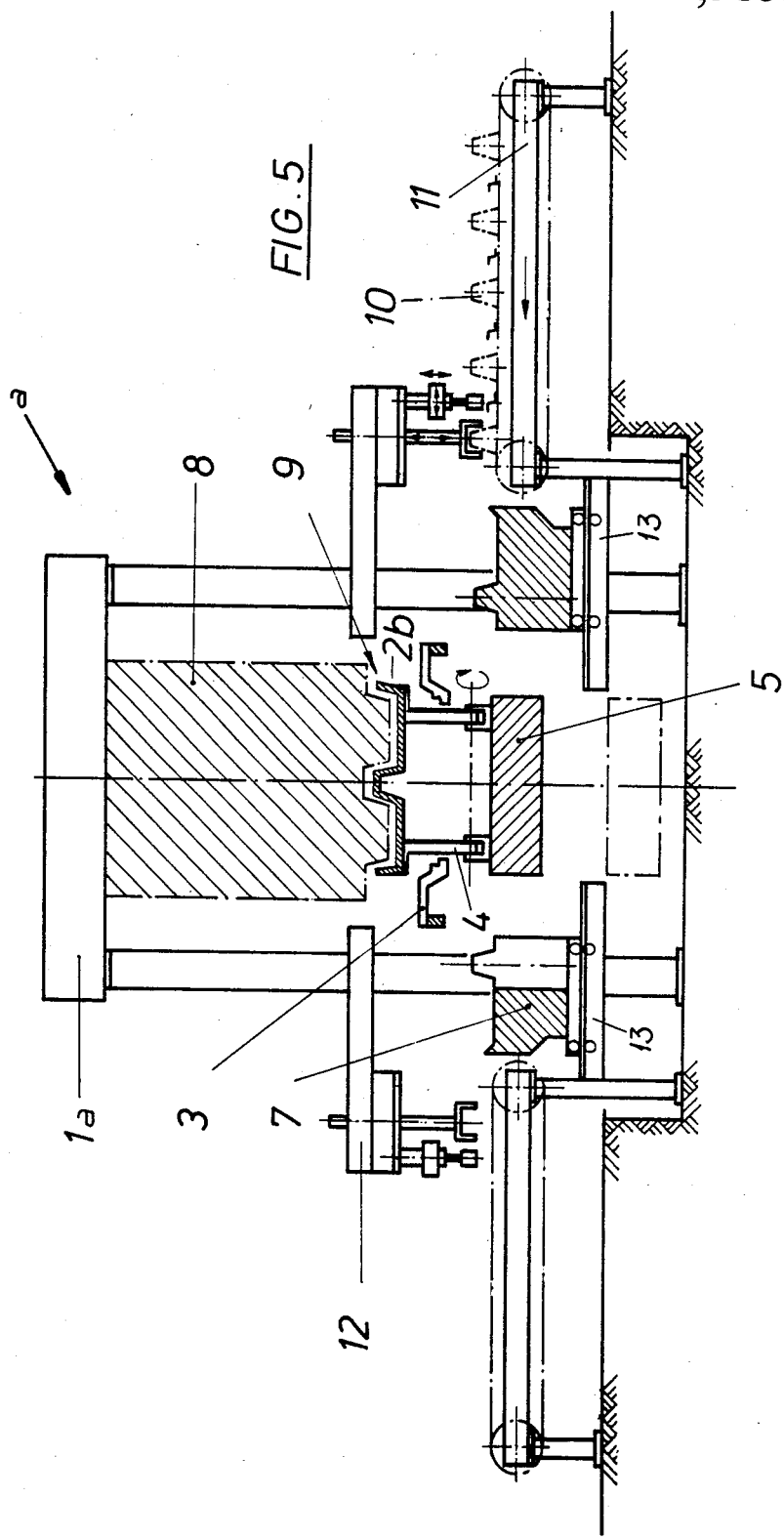

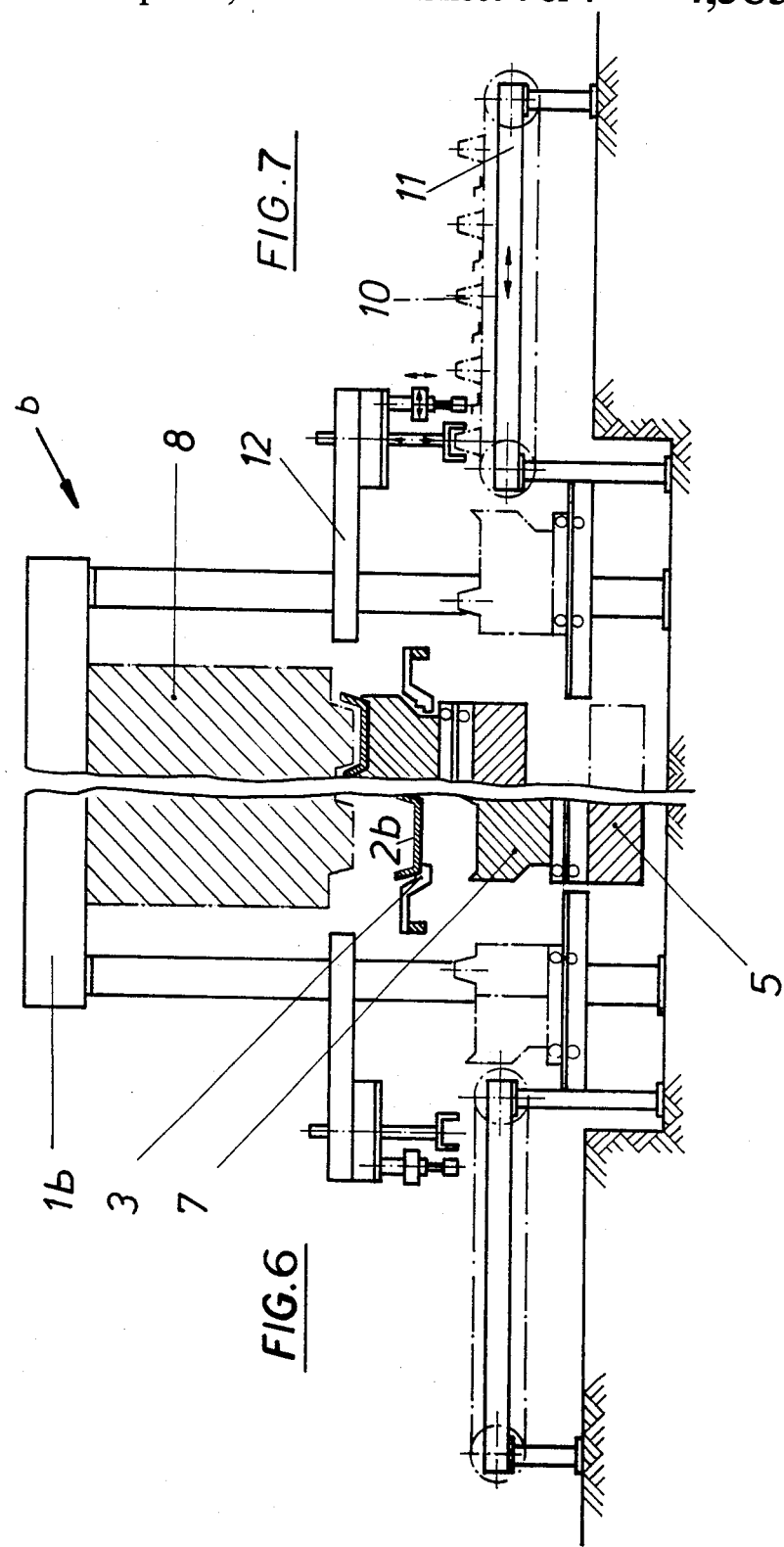

STEP-TYPE PRODUCTION LINE AND METHOD OF OPERATING SAME

FIELD OF THE INVENTION

The present invention relates to a step-type production line and to a method of operating such a line. More particularly this invention concerns a mass-production operation where workpieces are stepped through a concatenation of working stations.

BACKGROUND OF THE INVENTION

In a large mass-production operation, such as the manufacture of motor vehicles, it is standard practice to use a stepping or shuttle-type conveyor. The workpieces sit on the shuttles of the conveyor that transports them in steps through a concatenation or row of working stations. A machine or worker at each station performs an operation—welding, boring, tapping, painting, pressing, or the like—on the respective workpiece.

When the workpieces are large they are usually completely freed from the conveyor in each station, providing the opportunity for the unloaded conveyor to move a step back upstream prior to stepping the workpieces one more station downstream. Such removal is often required to ensure perfect positioning of the workpieces for the particular manufacture operation of the station.

This style of production is wholly unsuitable for small production runs, as retooling and changing the various machines to do different things or to work on different workpieces is an extremely onerous and time-consuming job. In fact it is not uncommon for a production line to be down for six months for a model change in the automotive industry.

It is known in small manufacturing operations to use a flexible conveyor system that allows stations to be skipped, or even different paths to be followed, and can even do different jobs at each station by using multiduty machines at some of the stations. Such a conveyor is extremely complex and expensive. Although it does make changing a production run much simpler, its cost cannot be justified when such a change is not done often.

OBJECTS OF THE INVENTION

It is therefore an object of the present invention to provide an improved production line and method.

Another object is the provision of such a production line and method which overcome the above-given disadvantages, that is which allows workpieces to be changed, or even different workpieces to be worked on in the same line.

SUMMARY OF THE INVENTION

A production line for working on a succession of workpieces according to the invention has a transporter or conveyor defining a longitudinal path for carrying and displacing the succession of workpieces in longitudinal stop-and-go steps through a succession of stations generally longitudinally equispaced along the path, respective machines at the stations for lifting the workpieces off the conveyor and working on the workpieces as same are stopped between transport steps, and a lifter at at least one of the stations for raising the workpieces thereof off the conveyor and holding them clear thereof between transport steps.

Thus some of the stations are merely holding or nonworking stations where nothing is done to the workpieces. The machines at this or these stations can be adapted to work only on other types of workpieces mixed in with the production run, or only on certain of the workpieces for custom work. Either way the heavy-duty shuttle or stepping conveyor can work in the normal manner. Furthermore with the system of this invention several different models can be made on a single production line. Such a production line can also be switched over machine by machine to a new model.

Means can also be provided according to this invention for feeding parts to at least one of the machines in a direction transverse to the path. Such transverse feed is particularly easy due to the straight-line layout possible with the system of this invention, although a crossing arrangement as described in copending application 474,544 filed 14 April 1983 could also be used. In addition the instant invention eliminates the necessity of providing space adjacent the line for the workpiece to sit in while being worked on, as the workpieces are worked on in a position only slightly above the level they are at while being conveyed. With this invention there is ample room to bring in two separate supplies of small parts from opposite transverse sides of the line.

Each station according to the invention is provided with respective such lifters. In addition the machine of the one station provided with the lifters has a lower tool engageable underneath and with the respective workpiece and an upper tool thereabove. The lifters each include a lifting platform or table displaceable between a down position below and out of engagement with the lower tool and an up position engaging up underneath the respective workpiece and holding same up in a raised position clear of the conveyor. The lower tool is displaceable horizontally between an outer position out from underneath the workpiece in the respective station and an inner position directly underneath the workpiece in the respective station. In addition the lower tool is subdivided into two transversely displaceable lower tool parts oppositely transversely displaceable between the inner and outer positions.

The lifter according to the invention is engageable up underneath the lower tool to press same up against the respective workpiece and press same in turn up against the upper tool. It is of variable height and is shorter when engaged directly against the lower tool than against the workpiece; that is the lifter can have two different heights. This is achieved by making the lifter of a lower unit or table displaceable vertically through a predetermined vertical stroke whether the respective station is working or holding, and a vertically extensible rack on the top of the table. The rack can be extended to an effective height above the top of the table that is slightly less than the effective height of the lower tool, so when same is in the out-of-the-way outer position raising the table will not push the workpiece up against the upper tool.

The method according to this invention therefore comprises the step of raising the workpiece at one of the stations off the conveyor and holding it clear thereof between transport steps while not working on the thus raised workpiece with the respective machine.

DESCRIPTION OF THE DRAWING

The above and other features and advantages will become more readily apparent from the following, reference being made to the accompanying drawing in which:

FIG. 5 is a large-scale section taken along line V—V of FIG. 1 through a nonworking or holding station; and FIGS. 6 and 7 are large-scale sections taken along line VI—VI through a working station in different operation positions.

SPECIFIC DESCRIPTION

Figure 1:
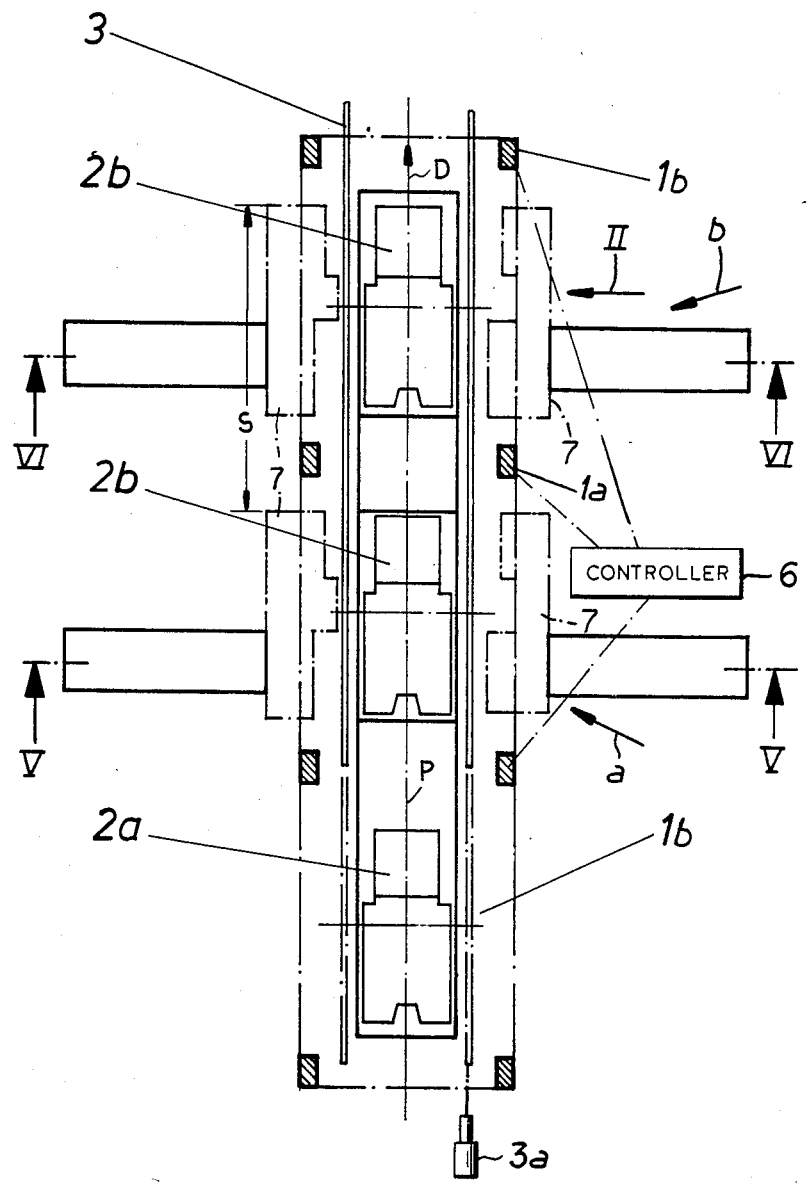
FIG. 1 is a small-scale top view of a portion of a production line according to this invention.

As seen in FIG. 1, workpieces 2a, here vehicle chassis, and workpieces 2b, which are also chassis but different from the workpieces 2a, are displaced in a longitudinal transport direction D by a stepwise shuttle-type conveyor 3 formed by longitudinally succeeding parallel rails that each extend through at least two stations a and b and that are operated by a drive such as a hydraulic cylinder 3a. Along the conveyor or transfer path P the stations a and b alternate with each other. The stations and the workpieces 2a and 2b are at a fixed spacing S and the conveyor rails 3 move first downstream in the direction D through a step equal to the spacing S while carrying the workpieces 2a and 2b to the next succeeding stations a or b, then these workpieces 2a and 2b are lifted off the conveyors 3 which then move back through the distance S in the opposite direction to return to their upstream home positions. During this return stroke the workpieces 2a and 2b in the statons a and b are worked on. Then the cycle is repeated, with each workpiece 2a and 2b moving one station a or b downstream with each step.

This action can of course also be carried out by other types of conveyors, such as belt conveyors, it merely being critical to the invention that the workpieces are moved intermittently with a full halt at each station, an action hereinafter referred to as stepping.

The production line is such that the stations a are provided with equipment only for working on the workpieces 2a and the stations b on the workpieces 2b. The station b cannot work on the pieces 2b and vice versa. To this end the stations a are provided with spot welders 1a and the stations b with differently configured welders 1b. It would of course be within the scope of the invention to replace these working units with other machines such as presses, painting sprayers, machine tools, or the like, even including multiple-tool or -function machines. Once again it is merely important to this invention that some of the working units be unable to work on some of the workpieces.

Figure 2:
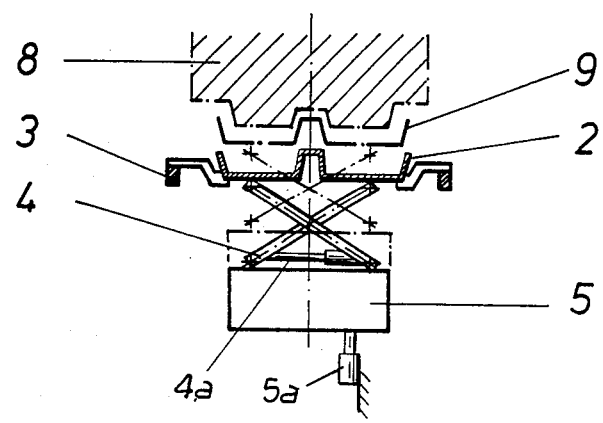
FIG. 2 is a side view taken in the direction of arrow II of FIG. 1 through a lifter according to this invention.

According to this invention each station a and b is provided as seen in FIG. 2 with a respective lift table 5 normally having a criss-cross rack 4. A stationary cylinder 5a can raise the lift table 5 transverse to the direction D and a further cylinder 4a can raise and lower the upper ends of the rack 4 relative to the respective table 5.

Thus according to the invention when the conveyor rails 3 are at the downstream end of the step and stationary, the cylinder 5a expands to engage and actually lift the workpiece 2a or 2b off the conveyor 3, elevating it to an intermediate position 9 below but out of contact with the upper tool 8 of the respective station a or b. In this position the conveyor 3 can return to its upstream position. Before the next downstream step of the conveyor 3 the workpieces 2a and 2b are set down on it again so they take part in this step.

Figure 3:
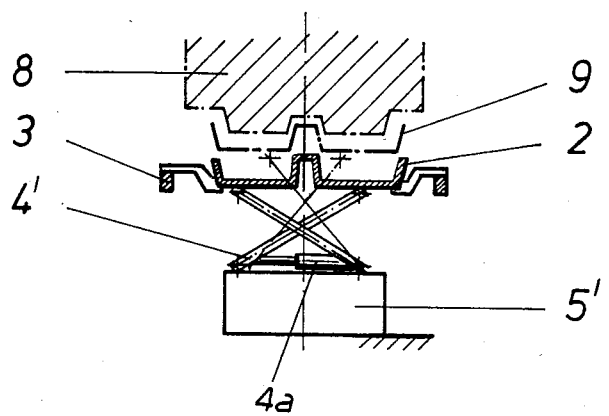
FIGS. 3 and 4 are side views of further lifters in accordance with this invention.

It is also possible as shown in FIG. 3 to use a stationary lifter table 5' having a rack 4' whose cylinder 4a issufficiently strong to lift the workpiece 2a or 2b itself. This system, due to the poor mechanical advantage, cannot function with workpieces quite as heavy as the system of FIG. 2, where the cylinder 4a need only be strong enough to lock the rack 4.

Figure 4:
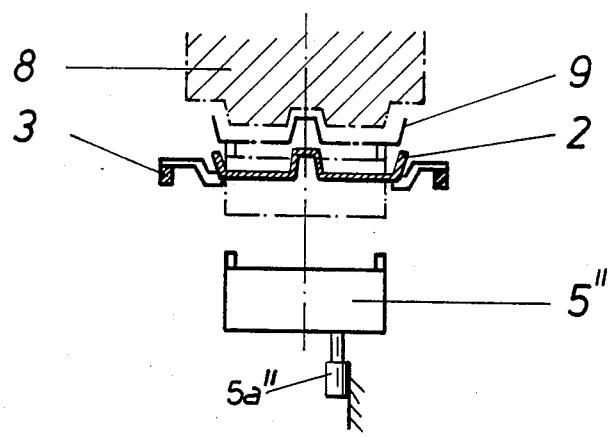

In FIG. 4 an arrangement is shown devoid of any rack, merely having a table 5" that is lifted by a respective cylinder 5a". Such an arrangement has the advantage of great simplicity.

FIG. 5 illustrates how the machine 1a at the station a has, in addition to its upper tool part 8, two lower tool parts 7 that can be moved transversely on respective rails 13 between the illustrated outer positions out from underneath the upper part 8 and inner positions (see FIGS. 6 and 7) fitting complementarily together and lying directly underneath the upper part 8. The lower and upper tool parts 7 and 8 respectively form and have respective upper and lower surfaces that are complementary to each other for spot welding of the chassis. In addition respective transverse conveyors 11 and feeding devices 12 can displace small parts 10 into the station a (or b) for welding by the tools 7 and 8 to the workpieces 2a.

As shown in FIG. 5, however, a workpiece 2b that does not fit properly with the tools 7 and 8 is in the station 1. In this situation, therefore, the parts 7 remain in their outer positions, the lifter table 5 is raised, and its rack 4 is lifted at the end of each downstream stepping of the conveyor so as to pick the workpiece 2b up off the conveyor 3 and hold it in the intermediate position up off this conveyor 3 and slightly below the upper tool 8. During the reverse step of the conveyor 8 and while the other machines 1a and 1b are working on the workpieces 2a and 2b that are correctly positioned in them, the workpiece 2b in the station a is therefore merely held out of the way. It is worked on when it is subsequently put into the next station. A controller 6 reads inidica on the workpieces 2a and 2b to determine if they should be worked on in the individual statons a and b.

When as shown in FIG. 6 the correct workpiece 2b is positioned in the station b at the spot welder 1b the controller 6 senses this and, with the lifter 5 still in the down position, moves the lower tools 7 inward onto their inner positions. Subsequent lifting of the table 5 as shown in FIG. 7 therefore raises the lower tool parts 7, lifting the workpiece 2b from the conveyor 3, centering it on the tool parts 7, and pressing it against the underside of the upper tool part 8. To thus raise the lower tool parts 7 the rack 4 is folded ompletely flat on the upper surface of the table 5.

Thus using the same vertical displacement or stroke of the lifter table 5, the respective station can serve as a working station or a simple holding station. For holding, the tool parts 7 are in their outer positions and the rack 4 is raised; for working, the rack 4 is flattened out and the tool parts are in their inner positions. The overall height of the raised rack 4 is slightly less than that of the tool parts 7 so in the holding mode the workpiece is not lifted up into contact with the upper tool 8.

It would also be possible to use a single lifting device that always makes the same vertical movement. In this case the shape of the workpiece is such relative to that of the tools that the right workpiece is properly lifted by the tool, but the wrong workpiece sinks too low in the lower tool to be worked on, while still having the lower tool lift it off the conveyor 3.

The system of this invention therefore allows different workpieces to be worked on in the same production line. For model changeover it is therefore possible to introduce the new model slowly, and it is even possible to do some custom work in a production line at stations that only work on some of the workpieces. All this is possible with a simple shuttle-type conveyor that is extremely inexpensive to build and maintain.

We claim:

1. A production line for working on a succession of workpieces of at least two different workpiece types in respective different ways, the line comprising:

transport means defining a longitudinal path for carrying and displacing the succession of workpieces in a lower position in longitudinal stop-and-go steps through a succession of stations generally longitudinally equispaced along the path;

means including machines capable of working in one of the respective ways at some of the stations and machines capable of working in the other way at others of the stations for working on the workpieces of the respective types as same are stopped between transport steps and in an upper position above the lower position and out of contact with the transport means; and lifter means at each of the stations for raising the workpieces therein when of the type corresponding to the respective machine into the upper position and when of the other type into an intermediate position between the upper and lower positions and out of contact with the transport means and with the respective machine, whereby when a workpiece is in a station of a machine not capable of working on it in the respective way the workpiece is merely held off the transport means in said intermediate position between transport steps.

2. The production line defined in claim 1, further comprising means for feeding parts to at least one of the machines in a direction transverse to the path.

3. The production line defined in claim 1 wherein the machines of the stations each have a lower tool engageable underneath and with the workpiece of the respective type and an upper tool thereabove, the lifter means including a lifting platform displaceable between a down position below and out of engagement with the lower tool and an up position engaging up underneath the workpiece and holding same up in a raised position clear of the transport means.

4. The production line defined in claim 3 wherein the lower tool is displaceable horizontally between an outer position out from underneath the workpiece in the respective station and an inner position directly underneath the workpiece in the respective station.

5. The production line defined in claim 3 wherein the lower tool is subdivided into two transversely displaceable lower tool parts oppositely transversely displaceable between the inner and outer positions.

6. The production line defined in claim 3 wherein the lifter is engageable up underneath the lower tool to press same up against the respective workpiece and press same in turn up against the upper tool.

7. The production line defined in claim 6 wherein the lifter is of variable height and is shorter when engaged directly against the lower tool than against the workpiece.

8. The production line defined in claim 6 wherein the lifter can have two different heights.

9. A method of operating a production line for working on a succession of workpieces of at least two different types in respective different ways, comprising the steps of:

transporting the succession of workpieces in longitudinal stop-and-go steps in a lower position through a succession of stations generally longitudinally equispaced along the path by transport means;

raising the workpieces between transport steps in each of the stations to either an upper position when the workpiece type corresponds to that of the machine of the respective station or to an intermediate position between the upper and lower positions and out of contact with the transport means and with the respective machine when of the other workpiece type, working on only those workpieces which are raised to said upper position, and returning all workpieces to said lower position and into contact with the transport means before the next transporting step.

* * * * *